United States Patent [19]
Bonnet

[11] 3,882,513
[45] May 6, 1975

[54] EQUIPMENT FOR RECORDING RELIEF OR STEREOSCOPIC IMAGES

[75] Inventor: Maurice Bonnet, Puteaux, France

[73] Assignee: Agence Nationale de Valorisation de la Recherche ANVAR, Neuilly-sur-Seine, France

[22] Filed: Aug. 2, 1973

[21] Appl. No.: 384,960

[30] Foreign Application Priority Data
Aug. 18, 1972 France.................. 72.29581

[52] U.S. Cl. .................................. 354/115
[51] Int. Cl. ................................. G03b 35/08
[58] Field of Search......... 95/18 P; 355/39; 354/115

[56] References Cited
UNITED STATES PATENTS

| | | | |
|---|---|---|---|
| 1,510,155 | 9/1924 | Nelson | 355/39 |
| 1,958,036 | 5/1934 | Draper | 95/18 P |
| 1,993,448 | 3/1935 | Huber | 354/115 |
| 3,675,554 | 7/1972 | Bonnet | 95/18 P |

*Primary Examiner*—John M. Horan
*Attorney, Agent, or Firm*—Baldwin, Wight & Brown

[57] ABSTRACT

Equipment for recording and subsequently reproducing relief or stereoscopic images. A chamber is provided with a rectangular window in the front wall and a convergent optical system facing the window. The convergent optical system directs light rays coming from an object at infinity towards the sensitive surface of a film with convex or concave lenticular elements. The plane of the rectangular window is located substantially in the object focal plane of the optical system. A dark slide shutter curtain closes off the rectangular window. The sensitive surface of the film is placed in a removable frame for receiving at least one optical surface having cylindrical lenticular elements. The chamber is suitable for both recording and reproducing relief images.

3 Claims, 12 Drawing Figures

PATENTED MAY 6 1975 3,882,513
SHEET 1 OF 2
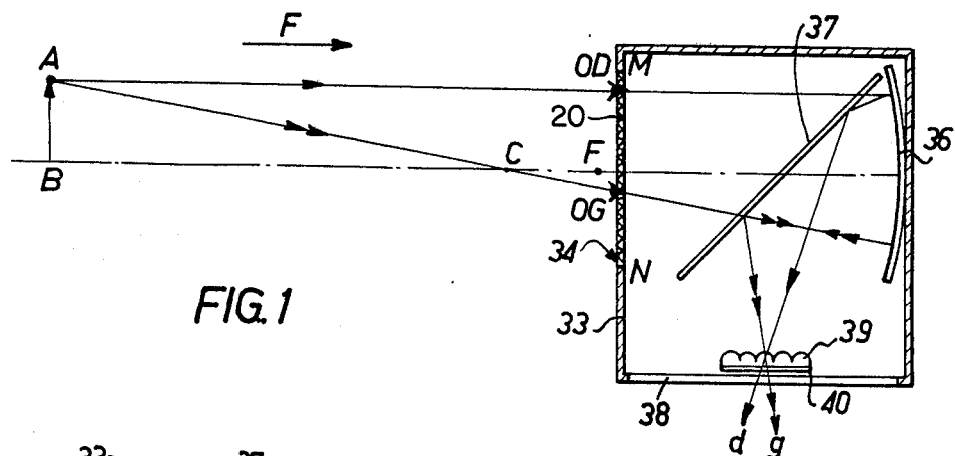
FIG.1
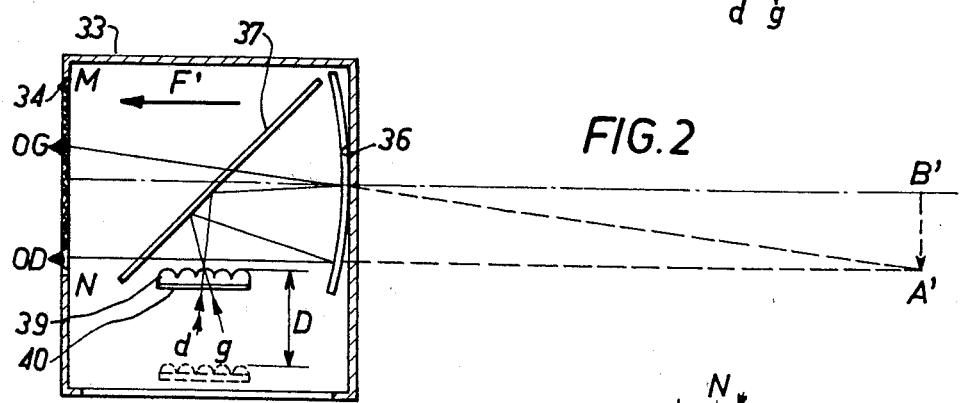
FIG.2
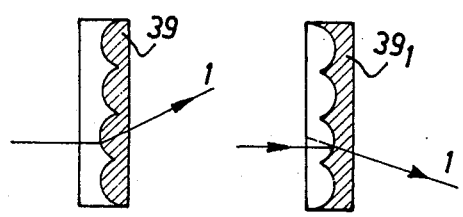
FIG.3  FIG.4
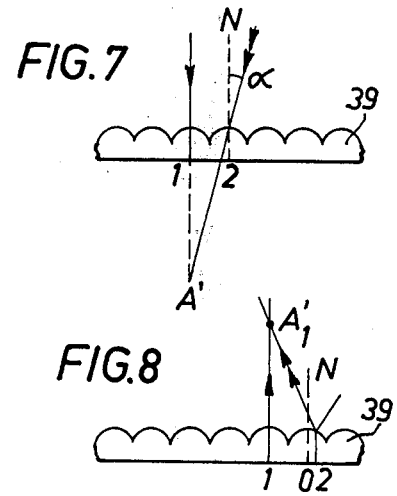
FIG.7
FIG.8
FIG.9

EQUIPMENT FOR RECORDING RELIEF OR STEREOSCOPIC IMAGES

The present invention concerns the field of recording stereoscopic or relief images as well as their eventual reproduction.

The present invention provides in particular improvements in the apparatus described in my earlier U.S. Pat. No. 3,675,554.

This prior patent describes equipment enabling the recording of stereoscopic or relief images and eventual reproduction of the images on a viewing range under conditions identical to those at the time of recording, thereby giving to the objects apparent dimensions similar to those seen in full size by the photographer.

This apparatus comprises a dark chamber, for example parallelepipedic, having on one of its large vertical sides, a rectangular window or opening in front of which a convergent optical system can be moved, comprising a concave mirror located in the chamber along the wall opposite the last-mentioned side, the successive images of the object situated at infinity, collected by the mirror, being reflected thereby towards a a semi-transparent separator plane mirror inclined 45° to the beam axis and which directs the rays to the sensitive layer of a cylindrical lenticular elements film.

In an embodiment given by way of example in my U.S. Pat. No. 3,675,554, a sliding optical system is placed in front of the window.

According to the present invention, it was first found that it was possible to use this photographic chamber for recording as well as reproducing images more simply than described in the earlier patent by replacing the sliding optical system with a shutter, for example a roller-blind shutter, which, during shooting, uncovers the rectangular window or opening of the front side or wall of the photographic chamber. Preferably, this rectangular window is located in the object focal plane of the concave mirror.

In the vicinity of the focal plane of the system of cylindrical lenticular elements is obtained an arrangement of the various elemental images which correspond generally to an "inverted" stereoscopic image; it is therefore necessary to provide stereoscopic erecting means which may be, however, of several equivalent sorts.

In certain cases, the reversible character (recording reproduction) may be entirely preserved.

One aspect of the present invention consists in an image-taking equipment in which the parallelepipedic chamber has a horizontal rectangular window or opening in its front wall or side in which a conventional shutter may be positioned; a concave mirror located along the wall opposite the previous one; a semi-transparent plane optical element inclined at a 45° angle with respect to the beam axis and a frame capable of receiving at least one optical surface provided with cylindrical lenticular elements, the said chamber thereby enables, in one direction of the path of the light rays, the recording of images on the aforesaid optical surface acting as a support for a sensitive layer and, in the other direction of the movement of the light rays coming from a light source, the viewing of relief images through the window in the front wall.

The dimensions of the chamber are determined by the desired recording base, the aperture of the concave mirror used must be equal to the width of the lenticular elements taken together.

To fully take advantage of the separating power of the human eye, the ratio of the center-to-center distance between grating and the distance between the mirror and the grated surface must be equal to or less than.

$$\alpha = \frac{3}{10,000} \text{ radians,}$$

that is at the normal visual acuity of the observer in order for the observer's eyes not to be disturbed by the gratings during reproduction of the image.

The present invention will be illustrated without in any way being limited by the following description made with reference to the accompanying drawings, in which:

FIG. 1 schematically shows the apparatus used for recording images;

FIG. 2 shows the same apparatus used for reconstituting or the direct viewing of the images;

FIGS. 3 and 4 show the path of the light rays through convex and concave lenticular elements respectively;

FIG. 7 shows the path of the light rays in recording through the selector made up of convex cylindrical lenticular elements;

FIG. 8 and 9 show the path of the light rays with and without reversal of the images;

Figure 10:
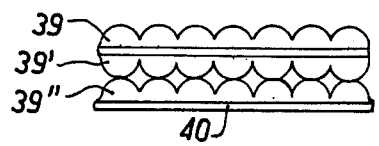
Figure 11:
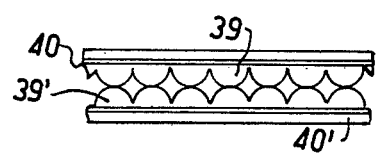
Figure 12:
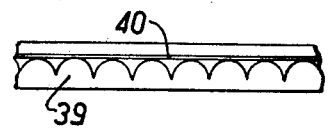

FIGS. 10–12 schematically illustrate methods of reversing the images.

FIG. 1 schematically shows equipment comprising a photographic chamber 33 having a lateral window or opening 34. The lateral window 34 is sufficiently large so that the total field of the recording base provided, which is a function of the field of the optical elements is covered with a light beam.

A removable or nonremovable shutter 20 is disposed in front of the window 34. It may be of any known type and is not illustrated in detail in the drawing.

A concave mirror 36 having a wide angular field is fixed along the wall forming the back of the chamber. The shutter is advantageously placed in the object focal plane of the mirror 36, i.e. the plane of the entrance pupil of the system is in this preferential position.

A separator 37 comprising a semi-transparent plane mirror arranged at a 45° angle with respect to the optical axis of the concave mirror 36 vertically reflects the beam towards a window 38 located in the base of the chamber, a frame fixed therein for holding optical surfaces 39 having lenticular elements and a sensitive surface 40.

The dimensions of the chamber are determined by the desired recording base and the focal length of the concave mirror used whose aperture must be equal to or greater than the width of all the lenticular elements.

The photographic chamber thus constructed enables the recording of remote images of objects on the sensitive surface 40, the direction of the light beams being that of the arrow F.

One finds that in recording a point A normally seen by the right eye OD and the left eye OG of the observer, the point A will give two points, $d$ and $g$, on the sensitive surface.

The photographic chamber or an identical chamber will subsequently enable the reproduction of the recorded point by lighting the optical surface 39 (FIG. 2) so that an observer located in front of the opening 38 may see the points d and g, but his right eye OD receiving the ray which formed the image g on recording. On the other hand, in both cases the observer sees the point A to the right of point B. In other words, the image viewed by the observer is "right" but the relief is "reversed".

The opening MN which forms the entrance pupil of the system during recording in FIG. 1 becomes the exit pupil of the optical system of FIG. 2, the direction of the beam being that of the arrow F'.

The images forming the exit pupils of FIG. 1 become the entrance pupils in FIG. 2.

However, for the reproduction of the recorded images, the observer will have to displace the optical surface 39 and bring it closer to the semi-transparent plane mirror 37 a distance D as shown in FIG. 2, the optical surface 29 being shown in broken lines in this position. In this figure, the distance D is very much exaggerated for the sake of clarity in the drawing.

A simple calculation may give the value of the displacement D through which the optical surface must be moved so that the image A' is apparently formed at a distance from the observer identical to the recording distance.

This displacement may be effected by moving the separator 37, the position of which being adjustable during recording and reproduction. But the characteristics of the plane mirror, particularly its thickness, must be taken into account.

It seems necessary to retrace the effects of the cylindrical lenticular elements in case of recording and reproduction of images in order to understand the various method which enable the erecting of the relief image.

First of all, it must be noted that it is possible to reverse the recorded images with convex gratings 39 (FIG. 3) by employing during reproduction concave gratings $39_1$ (FIG. 4). From these two figures it is seen that the direction of the ray 1 is returned.

Figure 5:
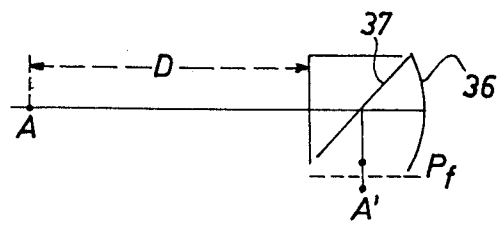
FIGS. 5 and 6 show the difference in length of the path of the beam during recording and reproduction

Upon studying the reproduction or reconstitution of different points in space at various distances from the image-taking camera, one notices that the necessary displacement of the image $A_1$ of each point, so that the image is re-formed at the same distance from the observer, varies with the distance D (FIG. 5).

Figure 6:
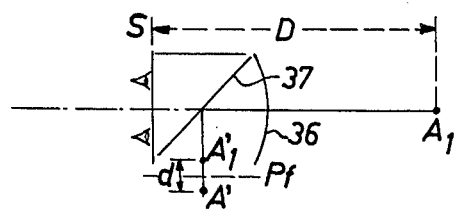

In reconstitution, the spatial distribution of the points is, as seen in FIG. 6, identical for the observer at point S by bringing the image symmetrical to the focal plane Pf of the mirror 36.

In recording, two rays successively forming image A (FIG. 7) are plotted on the sensitive surface at points 1 and 2, the second ray making an angle $\alpha$ with the line normal to the lenticular elements of the selector 39.

In reconstitution of the convex elements of a selector $39_1$, the point 1 (FIG. 8) will remain on the normal line $A'_1-1$ but the point 2 will be to the right of the normal NO, parallel to the said normal line $A'_1-1$.

On the other hand, if in reconstitution an optical surface 39 with concave lenticular elements is used, it will be noticed that the points 1 and 2 will have positions identical to those in recording relative to the normal NO.

As it was indicated above, other means may be used for turning over the images.

For this purpose, as shown in FIG. 10, three superposed selectors 39, 39' and 39" may be used, the thickness, spacing and curvature of the selectors being simply calculated according to known laws of optical geometry applied to the combination of refractive optical elements. On the other hand, for reconstitution, only the selector 39" will be used.

Another means of reconstituting the relief comprises printing a positive in a laboratory on a sensitive surface 40' (FIG. 11) integral with the convex lenticular elements 39' from a negative obtained on a surface 40 integral with the convex lenticular elements 39 by bringing the elements 39 in contact with the elements 39'.

In reconstitution, in case it is desired to form a full size real image—for example for photogrammetry—no treatment is necessary because, on the contrary, the reconstitution must be carried out under the identical conditions of the recording.

Finally, it should be noted that in reconstitution, if parallel lighting is used, the emulsion or film need no longer be in the focal plane of the grating elements, this improves the quality of the image and enables the possibility of the manufacture of fluted or channelled supports whose thickness and curvature may be different from those used for recording in particular, thinner supports.

Further, the sensitive surface 40 may be brought into direct contact with the lenticular elements 39 as shown in FIG. 12.

Reproduction devices (viewers) satisfying the conditions of observation are described in particular U.S. Pat. No. 3,675,554.

The present equipment may be used to obtain stereoscopic or relief photographic films in which the composite images recorded through cylindrical lenticular elements may be viewed subsequently by the observer while giving the latter the impression of a real-to-life view of the object.

The various arrangements and embodiments for carrying out the invention were given hereinbefore only by way of non-limiting examples; variations, alternatives and modifications may be introduced without going beyond the scope of the invention.

In this way, the reflective optics used in the experimental devices may be replaced by refractive optics of equivalent optical characteristics.

What we claim is:

1. In a device for recording relief images of remote objects, the combination of:

a housing having an opening in one wall thereof;

a convergent optical system disposed within said housing and aligned with said opening, said optical system being spaced from said opening by an amount substantially equal to the principal focus of such optical system, and said optical system comprising a concave mirror facing said opening and a semitransparent mirror disposed between said concave mirror and said opening and inclined at a 45° angle;

a sensitive film disposed in said housing and lenticular means comprising at least one optical element overlying said film and having a surface composed of cylindrical lenticular elements, and sensitive film and overlying optical element being positioned to receive an image from said optical system.

2. In a device as defined in claim 1 wherein the angle subtended by the center to center spacings of said lenticular elements at said concave mirror is not greater than 3/10,000 radians.

3. The device according to claim 1 wherein said lenticular means comprises a plurality of superposed lenticular elements to form images on said film such that a correct stereoscopic image is produced thereby when viewed through said opening with a single lenticular element overlying said film.

* * * * *